United States Patent [19]

Ostapovitch

[11] 4,343,076

[45] Aug. 10, 1982

[54] APPARATUS, AND A METHOD, FOR REMOVING TERMINAL PINS FROM A BANDOLIER

[75] Inventor: Harold J. Ostapovitch, Lachine, Canada

[73] Assignee: Northern Telecom Limited, Montreal, Canada

[21] Appl. No.: 207,271

[22] Filed: Nov. 17, 1980

[51] Int. Cl.[3] .............................................. B23P 19/00

[52] U.S. Cl. .................................................. 29/426.5

[58] Field of Search ...................... 29/426.5, 739, 741, 29/759

[56] References Cited

U.S. PATENT DOCUMENTS 4,316,321 2/1982 Wickham ............................. 29/739

*Primary Examiner*—Leon Gilden

*Attorney, Agent, or Firm*—Sidney T. Jelly

[57] ABSTRACT

Terminal pins, mounted on bandoliers, for treatment and other purposes, are removed rapidly from the bandolier, without bending or changing the end-to-end orientation. The bandolier is pulled at speed through a tool having a slot for the bandolier, a rib extending into the slot and having a chamfered leading or front edge. The chamfered end enters a clearance between pin and bandolier, the pin being forced away from the bandolier while the bandolier is held down by the rib. The pins are removed at high speed and hit an inclined surface extending over the chamfered end to be deflected sideways through a passage. The pins exit from the passage and can be fed to an assembly machine, loading apparatus or storage containers. Air may be blown through the passage to assist in removing the pins.

12 Claims, 16 Drawing Figures

APPARATUS, AND A METHOD, FOR REMOVING TERMINAL PINS FROM A BANDOLIER

This invention relates to apparatus for, and a method for, removing terminal pins from a bandolier.

Terminal pins, particularly as used in multi-pin connectors for telecommunications, are produced in extremely large quantities and usually are plated with a corrosion and errosion resistant metal which will give good electrical contact, for example gold. The pins are formed from coils of wire of suitable cross-section, and are usually "coined" at a predetermined position along the length to slightly increase the cross-sectional dimensions to give a push fit in holes in the connector member or other member, to which they are assembled. The pins are straight within close limits, and have a particular end-to-end orientation.

To permit of plating, and possibly other treatments, the pins are attached to a bandolier—a continuous strip of metal having formed fingers which hold the pins. Once the treatment of the pins is finished, it is required to remove the pins. Because of the numbers used, it is desirable to remove the pins at high speed but at the same time not affecting the straightness and also retaining the end-to-end orientation.

The present invention provides an apparatus in which the pins are removed at very high speeds, without bending and retaining the orientation. The bandolier, with pins attached, is fed through a block—formed of a number of parts. The present invention also provides a method enabling removal of terminal pins from a bandolier.

One or more chamfered members enter under each pin, in a gap between pin and bandolier, and lift the pin while the bandolier is held down. The pin lifts up, bending back the fingers holding the pin, and moves upwardly and sideways, to exit from a side of the block. The pins may be fed from the block to an assembly machine or to a loading apparatus for an assembly machine or to storage containers. Air may be blown in at the side of the block remote from that from which the pins exit, to assist the exit of pins from the block.

The invention will be readily understood by the following description of an embodiment, by way of example, in conjunction with the accompanying drawings, in which.

Figure 1:
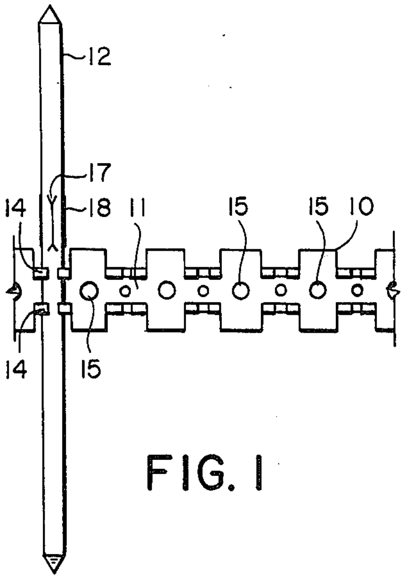
FIGS. 1 and 2 are top plan view and side view respectively of a bandolier, shown with a pin in position.
Figure 2:
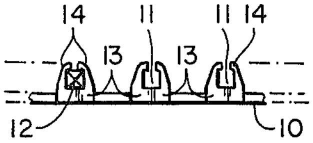

FIGS. 1 and 2 illustrate a length of a bandolier 10, the particular length shown having five pin holding positions indicated generally at 11, one pin 12 being shown in position. The pin holding positions 11, are generally referred to as "star sections". These sections, or positions, are formed at intervals along a flat strip of material, for example brass, by shearing and forming upwardly extending narrow webs 13, a web on each side and parallel to each other, each web having two spaced apart fingers 14 extending upwardly, one at each end of the web. The ends of the fingers are bent over pins resting on the top edges of the webs to hold them in position. This is seen in FIG. 2.

The bandolier is perforated, at 15, to provide means for feeding the bandolier through the forming apparatus and the pin loading apparatus. The pins are held with a small clearance between the pin and the flat surface of the main portion of the bandolier, this clearance being determined by the height of the webs 13.

The pins are usually coined to produce indents in the flat sides, as indicated at 17. This causes a localized increase in the cross-sectional dimensions of the pin. Thus the pin will readily insert into a hole, in a connector or other member, and a friction fit only occurs at the end of insertion when the coined, enlarged, portion 18 enters the hole.

The positioning of the enlarged portion along a pin can vary. Thus it can be at one end, midway along the length of a pin, or at some other position. Normally a pin is held at the holding position or star section at the enlarged portion 18. The coining 17 and enlarged portion 18 is shown displaced from the holding position in FIG. 1, for clarity.

One end of each pin is generally plated, for example gold plated. Because of the plating, and the coining when this is off center, the end-to-end orientation of the pins is required to be maintained, as resorting would be completely uneconomic. Also, the pins must remain straight within very tight limits. It will be appreciated that in a connector or other device having possibly a very large number of pins, just one pin being bent can prevent insertion of the whole connector, or device. Similarly, if even a few pins have only a very slight bend, insertion forces will be very high, possibly high enough to cause damage.

The apparatus, or tool, illustrated in FIGS. 3 to 15, and particularly in FIGS. 11 to 15, is intended for removing pins generally as in FIG. 1, that is held at the center.

Figure 4:
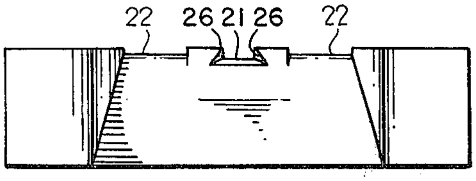
FIGS. 3 and 4 are top plan view, and end view respectively of a base member.
Figure 3:
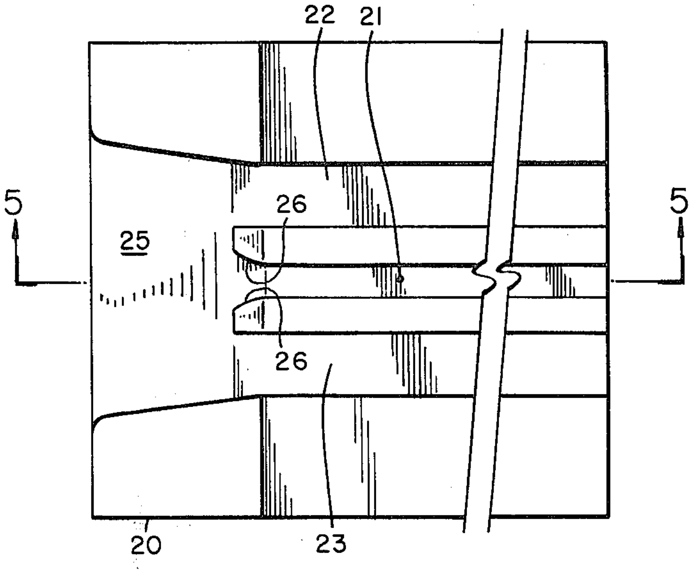
Figure 5:
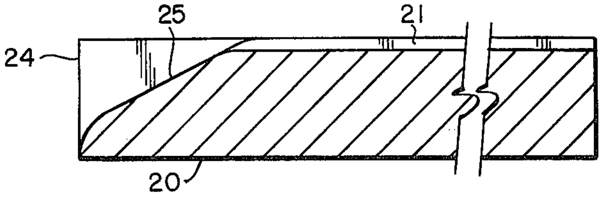
FIG. 5 is a cross-section on the line 5—5 of FIG. 3.

The apparatus comprises a base and a top which cooperate to form a slot through which the bandolier is pulled. Thus, as illustrated in FIGS. 3, 4 and 5, the base 20 has, on its top surface, a central groove 21 and two shallower grooves 22 and 23, one on each side of the center groove 21, and extending longitudinally for the major part of the length of the base. At the entry end, 24 a ramp 25 is formed. The sides of the center groove 21 are chamfered at the entry, at 26.

Figure 6:
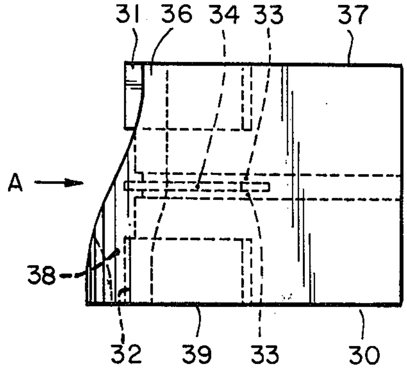
FIGS. 6 and 7 are top view and side view respectively of a top member which fits on the base member of FIGS. 3, 4 and 5.
Figure 8:
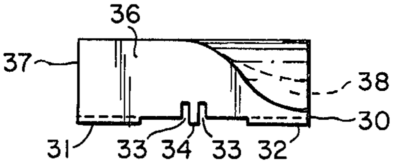
FIG. 8 is an end view in the direction of arrow A in FIG. 6.
Figure 7:
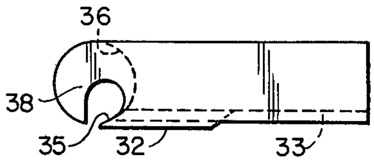

The top 30, illustrated in FIGS. 6, 7 and 8, rests on the base and on the bottom surface has two rectangular projecting areas 31 and 32. The areas 31 and 32 rest in the grooves 22 and 23 of the base. In the center of the bottom surface, between the areas 31 and 32 are two narrow grooves 33 defining a rib 34. Rib 34 depends below the bottom surface of the base and extends for part of the length of the base. The front end, or inlet end, 35 is chamfered upwardly and rearwardly and this is formed by a cylindrical bore 36 extending transversely across the end of the base from an outlet side 37, merging with a tapered bore 38 extending from the opposite side 39.

When the top is assembled to the base, the rib 34 extends down part way into the center groove 21 of the base.

Figure 9:
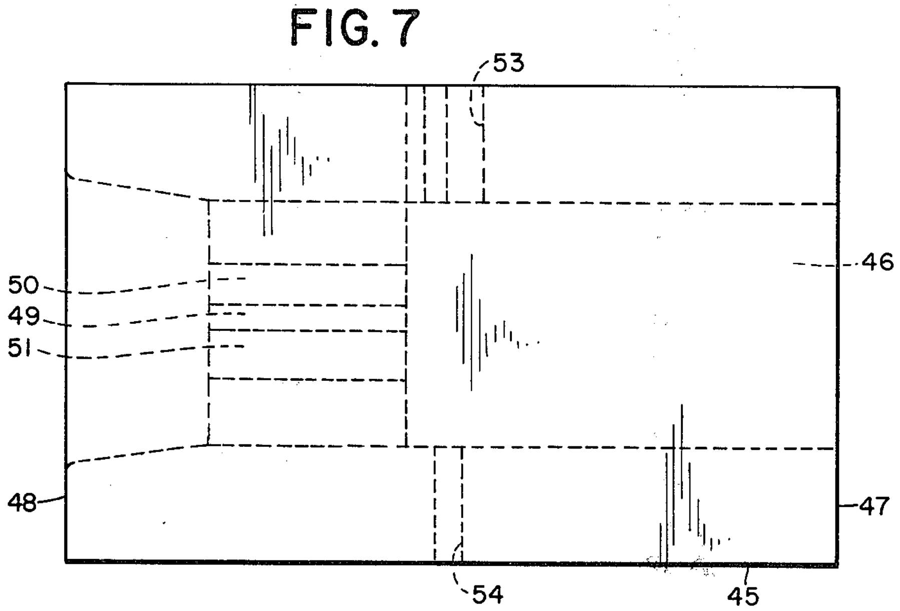
FIG. 9 is a top view of a cover member which fits over the top member and attached to the base member.
Figure 10:
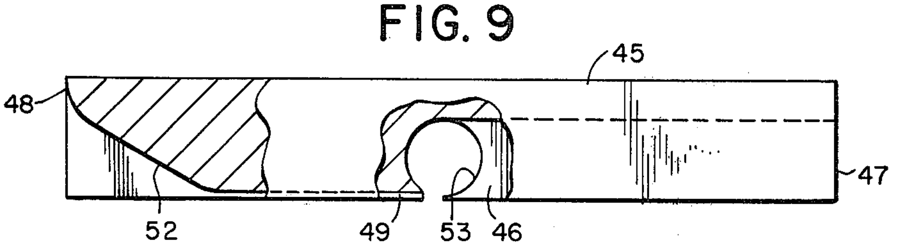
FIG. 10 is a side view of the cover member in FIG. 9, partly in cross-section.

FIGS. 9 and 10 illustrate the cover member 45. The cover member has a recess 46 formed in the bottom surface for reception of the top 30. The recess extends from the exit end 47 forward to a generally mid-position. Extending forward from the end of the recess 46 towards the entry end 48 is a central groove 49 and two grooves 50 and 51, one on each side of the central groove 49. The central groove 49 and side grooves 50 and 51 are vertically aligned with the forward parts of center groove 21 and side grooves 22 and 23 of the base 20 when the top is positioned on the base, that is groove 50 positioned over the forward part of groove 22 and groove 51 positioned over the forward part of groove 23 and by this means forming slots through which the pins may travel. Groove 49 and the forward part of groove 21 also form a slot through which the bandolier passes. The entry end 48 of the cover member has an inclined ramp 52, similar to ramp 25 of the base.

A bore 53 extends from the recess 46 on what is to be the outlet side of the apparatus, and on assembly is aligned axially with the bore 36 of the top. At the other side a smaller bore 54 extends to the recess 46 and is aligned with the bore 38 of the top, when assembled. By this means, air can be blown in through bore 54 to assist in the ejection of removed pins out through bore 36 and bore 53. A tube can be attached at the outlet from the bore 53 to lead the pins to a loading fixture or insertion apparatus.

FIGS. 11 to 15 illustrate an assembled apparatus or tool. The bandolier, with pins attached, is fed in through the entry, defined by the ramps 25 and 52. The bandolier passes along the slot or passage defined by the grooves 21 and 49, the pins, at an intermediate position of their lengths sliding through shallow slots 60 formed between opposed surfaces of the base 20 and top 30. The outer ends of the pins pass along the slots defined by the grooves 22 and 50 and 23 and 51 respectively. The bandolier passes under the center web 34 with the web positioned on the center of the bandolier, that is between the webs 13, FIGS. 1 and 2. The front edge of the chamfered end 35 of the rib passes under the pins, in the small clearance between the pin and the flat surface of the bandolier. As the bandolier moves through the tool, it is held down by the web 34, but the pin is forced upward by the chamfered end of the rib, bending back the ends of the fingers 14.

Figure 11:
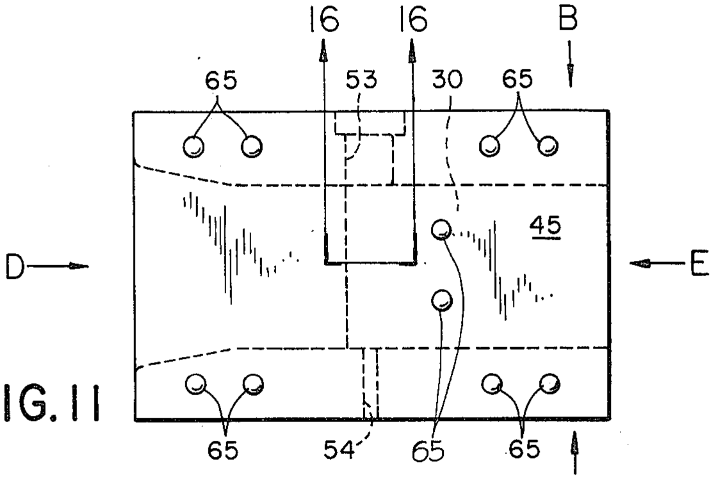
FIG. 11 is a top view of an assembled block or tool, to a reduced scale.
Figure 12:
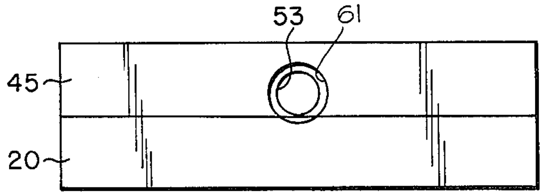
FIG. 12 is a side view in the direction of arrow B in FIG. 11.
Figure 14:
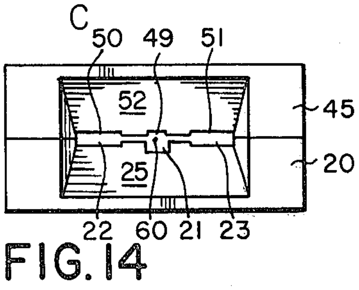
FIG. 14 is an end view in the direction of arrow D in FIG. 11.
Figure 13:
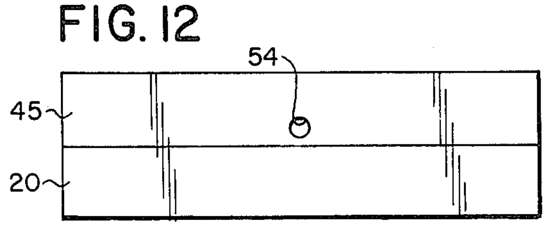
FIG. 13 is a side view in the direction of arrow C in FIG. 11.
Figure 15:
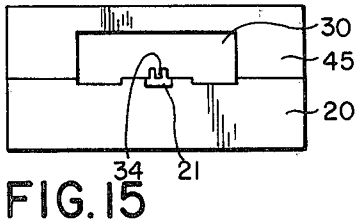
FIG. 15 is an end view in the direction of arrow E in FIG. 11.

The bandolier is pulled through the tool at a high speed, for example at about 5 inches a second, and the pins leave the bandolier at a considerable speed. The tapered bore 38, in the top, converts the upward movement of the pins into a lateral movement, by deflecting the pins, and the pins issue through bore 36 at a high speed. This can be enhanced by blowing in air via bore 54. This bore can be threaded for reception of a threaded connector, to which an air hose can be connected. The bore 53, in FIGS. 11 and 12, is shown counterbored at 61, and a tube can be inserted, or the counterbore threaded and a connector screwed in. It is important that no impediment be offered to the flow of pins from bore 36 and no projecting edges or rims be present.

Figure 16:
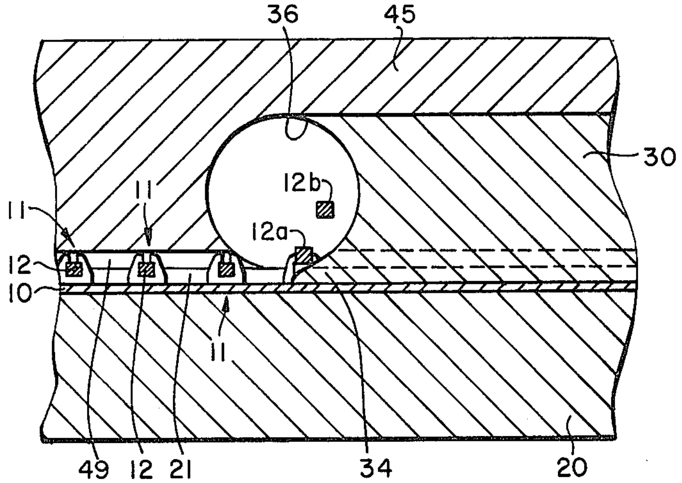
FIG. 16 is a part cross-section, on the line 16—16 of FIG. 11 to an enlarged scale.

FIG. 16 illustrates the action of pin removal. The bandolier is seen at 10 with a plurality of pin holding positions or star sections seen at 11. Pins 12 are seen held on the bandolier for the first three positions or star sections from the left hand side. A pin 12*a* is seen in the process of being pushed up out of a holding position by the inclined end of the rib 34, the ends of the fingers 14 having been bent up. At 12*b* is a pin which has been propelled upward from a previous holding position and is also moving sideways, in a direction normal to the plane of the sheet of the drawing, in a direction away as viewed.

The embodiment of the apparatus or tool described is for bandoliers holding pins at their center, as in FIGS. 1 and 2. For offset pins, stated previously, the pins may be held off center or close to one end. Thus, for example, considering FIG. 14, for pins held at one end, the slot defined by the grooves 22 and 50 would not be required, or alternatively the slot defined by grooves 23 and 51 would not be required. In effect, the slot 60, with rib 39 would be offset. The slot 60 would be offset depending upon the position along a pin at which it is held.

The bandolier can be pulled through in various ways, for example by passing over a toothed wheel or roller, which engages in the perforations 15, the wheel of pulley driven by a suitable source, for example an electric motor. The bandoliers would normally be supplied in rolls and fed to the apparatus or tool, which would be mounted on a convenient support. The used bandolier would then either be rolled up or passed to a bin for reclaiming as scrap. To initiate pin removal, a short engagement over the driven wheel or pulley.

The tool parts are held together by screws passing through, at positions indicated at 65. Conveniently headed screws pass through counterbored holes in the cover member 45 through holes in the top 30, and into threaded holes in the base 20.

Instead of the pins being held up from the base of the bandolier, by the webs 13 in FIG. 2, to give a small clearance, it is possible to give the base of the bandolier a channel form, to provide the clearance for entry of the chamfered end 35 of the rib 34 under the pins. Also, instead of a single rib 34 passing under the pins at the center of the bandolier, it is possible to have two such ribs, spaced apart, and passing under the pins immediately outside of the webs 13. The bandolier would still be held down while the pins are removed. Two spaced grooves 21 would then be provided.

The terminal pins, while illustrated as being of square cross-section, can be of other cross-sections, such as round or flat.

What is claimed is:

1. Apparatus for removing terminal pins from a bandolier, comprising:

a base and a top defining a slot therebetween for passage of the bandolier;

at least one rib extending into the slot and having a chamfered forward end, said forward end adapted to enter a clearance between the terminal pin and the bandolier, the bandolier passing beneath the rib and the pin ejected upward from the bandolier;

a transverse passage above said forward end of said rib, said passage having an exit at one end for emission of pins therethrough and having an inclined surface on the side of the rib remote from the exit, the inclined surface extending over the forward end of the rib, whereby the pins removed from the bandolier hit the inclined surface and are impelled laterally to the exit.

2. Apparatus as claimed in claim 1, including a groove extending along each side of said rib, upstanding webs and fingers on said bandolier passing along said grooves after removal of pins.

3. Apparatus as claimed in claim 1, said transverse passage including an air inlet at an end remote from said exit, for blowing of air through said passage to assist in emission of pins.

4. Apparatus as claimed in claim 1, said slot having a chamfered inlet end.

5. Apparatus as claimed in claim 1, said base having a top surface and a central groove in said top surface extending in the direction of movement through the slot, said top having a bottom surface in contact with the top surface of the base, a central rib extending from the bottom surface into said central groove, and a groove extending along each side of the central rib, said transverse passage extending above the rib.

6. Apparatus as claimed in claim 5, said base further including two shallow grooves, one on each side of said central groove and spaced therefrom;

said top including two projecting areas, one on each side of said central rib and spaced from the grooves extending along each side of the rib, the projecting areas positioned in the shallow grooves for lateral alignment of the base and top.

7. Apparatus as claimed in claim 6, including a cover member having a bottom surface, a recess in said bottom surface, said top positioned in said recess, the cover member attached to the base, and a bore in one side extending from said recess in alignment with said exit of said transverse passage.

8. Apparatus as claimed in claim 7, said recess extending forward from a rear end, a central groove in the bottom surface extending forward from said recess to a front end, and a shallow groove in the bottom surface on each side of and spaced from the central groove.

9. Apparatus as claimed in claim 7, said transverse passage defined by a forward end of the top and a forward end of the recess.

10. Apparatus as claimed in claim 9, said passage defined by an arcuate concave surface at said forward end of the top and an arcuate convex surface at said forward end of the recess, said chamfered forward end of said rib melding with said arcuate surface at said forward end of the top.

11. A method for the removal of terminal pins from a bandolier, comprising:

mounting the terminal pins on a bandolier with a clearance between part of each pin and a related part of the bandolier;

pulling the bandolier through a tool having a top and a base defining a slot for the bandolier;

inserting the chamfered leading edge of a rib extending into the slot into the clearances between the pins and the bandolier and lifting the pins off the bandolier, the pins hitting an inclined surface extending over the leading edge of the rib and being deflected sideways to be impelled laterally towards an exit of a transverse passage.

12. A method as claimed in claim 11, including blowing air through said transverse passage to assist in removal of the pins from the passage.

* * * * *